(12) United States Patent
Kobashi et al.

(10) Patent No.: US 7,804,828 B2
(45) Date of Patent: Sep. 28, 2010

(54) COMMUNICATION METHOD BETWEEN COMMUNICATION NETWORKS

(75) Inventors: Kazuhiro Kobashi, Tokyo (JP); Motohisa Araki, Tokyo (JP); Shuichi Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 956 days.

(21) Appl. No.: 11/111,631

(22) Filed: Apr. 21, 2005

(65) Prior Publication Data
US 2006/0002375 A1 Jan. 5, 2006

(30) Foreign Application Priority Data
Jun. 30, 2004 (JP) ............................ P2004-194949

(51) Int. Cl.
*H04B 3/20* (2006.01)
*H04L 5/14* (2006.01)
*G06F 15/16* (2006.01)
*G05B 19/00* (2006.01)

(52) U.S. Cl. .................. 370/389; 370/395.43; 709/229

(58) Field of Classification Search ............. 370/236.1, 370/254, 255, 282, 283, 360, 362, 363, 368, 370/377, 383, 384, 389, 395.31, 399, 401, 370/402, 415, 414, 417, 419, 428, 429, 471, 370/901, 902, 908, 911, 466, 352, 356; 709/245
See application file for complete search history.

(56) References Cited

U.S. PATENT DOCUMENTS

| | | | |
|---|---|---|---|
| 6,510,154 B1 | 1/2003 | Mayes et al. | |
| 7,417,978 B1* | 8/2008 | Chou et al. | 370/352 |
| 2001/0036190 A1* | 11/2001 | Takahashi | 370/401 |
| 2002/0181500 A1 | 12/2002 | Higuchi et al. | |
| 2003/0110292 A1* | 6/2003 | Takeda et al. | 709/245 |
| 2003/0161295 A1 | 8/2003 | Shah et al. | |
| 2003/0169766 A1 | 9/2003 | Ogawa | |
| 2004/0017818 A1 | 1/2004 | Chung | |
| 2004/0190549 A1* | 9/2004 | Huitema | 370/466 |
| 2004/0249974 A1* | 12/2004 | Alkhatib et al. | 709/245 |
| 2005/0066038 A1* | 3/2005 | Sakamoto et al. | 709/227 |

FOREIGN PATENT DOCUMENTS

| | | |
|---|---|---|
| JP | 2002-368773 | 12/2002 |
| JP | 2003-224580 | 8/2003 |
| JP | 2003-289318 | 10/2003 |
| JP | 2003-324482 | 11/2003 |

\* cited by examiner

*Primary Examiner*—Chirag G Shah
*Assistant Examiner*—Nima Mahmoudzadeh
(74) *Attorney, Agent, or Firm*—Blakely, Sokoloff, Taylor & Zafman LLP (57) ABSTRACT

According to one embodiment, a communication method comprises receiving, in a first communication network for example, a packet from a terminal connected to a second communication network. The packet includes source address information therein. A determination is made whether the source address information had been changed from an original address used in the second communication network to a changed address used in the first communication address. The changed address being associated with the terminal is stored and the source address information including the changed address is provided to a terminal connected to the first communication network. Communications are supported using the source address information between the terminal connected to the first communication network and the terminal connected to the second communication network.

22 Claims, 6 Drawing Sheets

COMMUNICATION METHOD BETWEEN COMMUNICATION NETWORKS

CROSS-REFERENCE TO RELATED APPLICATIONS

This application is based upon and claims the benefit of priority from Japanese Patent Application No. 2004-194949, filed Jun. 30, 2004, the entire contents of which are incorporated herein by reference.

BACKGROUND

1. Field

One embodiment of the invention relates to a communication method and communication system for making voice communication between telephone terminals via an Internet Protocol (hereinafter "IP") network such as an IP telephone system.

2. Description of the Related Art

In recent years, IP telephone networks, namely a network telephone system adapted for real-time transmission and reception while handling an image or a voice as packet data in a bi-directional manner via a packet network, has been prevailingly popular. For IP telephone systems, a plurality of IP telephone terminals are connected in a private network such as a Local Area Network (hereinafter "LAN"), and the private network is connected to a public network or a global network such as the Internet via a router device. The router device performs address conversion, thereby enabling multimedia information communication between the multiple IP telephone terminals over the global network. In this case, the plurality of IP telephone terminals connected to the private network and the global network are handled as extension terminals of an exchange apparatus.

In the meantime, the above-described system incorporates a Network Address Translator (herein after "NAT") function in the router device. The NAT function is provided as a function for employing one IP address which has been allocated in advance for connection, thereby converting a private address into a global address to transmit the converted address as a transmission source IP address, followed by converting a global address of an IP address which is an address to be supplied in reception into a private address. Such an NAT function is described in an Request For Comments (RFC) 1631, and it is disclosed by, for example, Japanese Patent Application Publication (KOKAI) No. 2003-289318, Japanese Patent Application Publication (KOKAI) No. 2002-368773, and Japanese Patent Application Publication (KOKAI) No. 2003-324482.

In the above-described system, during transmission of a voice packet, an IP address and a port number are included with a header area of an User Datagram Protocol (hereinafter "UDP") packet are converted by a router device. However, an IP address and a port number included a data area of the UDP packet are not converted. Therefore, making it possible to connect an IP telephone terminal as extension of a main device, but making it substantially unable to communicate a voice data.

In order to solve this problem, development of a Virtual Private Network (hereinafter "VPN"), an Application Level Gateway (hereinafter "ALG"), a Simple Traversal of UDP Through NAT (hereinafter "STUN") protocol and the like is proposed.

However, in all of these schemes, any software which may convert an IP address and a port number included in a data area of the UDP packet, needs to be packaged for an IP telephone terminal or a router device, and therefore, the existing terminals and routers cannot be uniformly utilized as they are, forcing a user to expose a burden on cost efficiency or scheduling.

BRIEF DESCRIPTION OF THE SEVERAL VIEWS OF THE DRAWINGS

The accompanying drawings, which are incorporated in and constitute a part of the specification, illustrate embodiments of the invention, and together with the detailed description of the embodiments given below, serve to explain the principles of the invention.

DETAILED DESCRIPTION

Various embodiments according to the present invention will be described hereinafter with reference to the accompanying drawings. In general, according to one embodiment of the invention, a communication method comprises receiving, in a first communication network, a packet from a terminal connected to a second communication network. The packet includes a source address information therein. Then, a determination is made whether the source address information had been changed from an original address used in the second communication network to a changed address used in the first communication network. The changed address associated with the terminal is stored and a terminal connected to the first communication network is notified that the source address information includes the changed address. The terminal connected to the first communication network uses the source address information to communication with the terminal connected to the second communication network.

Figure 1:
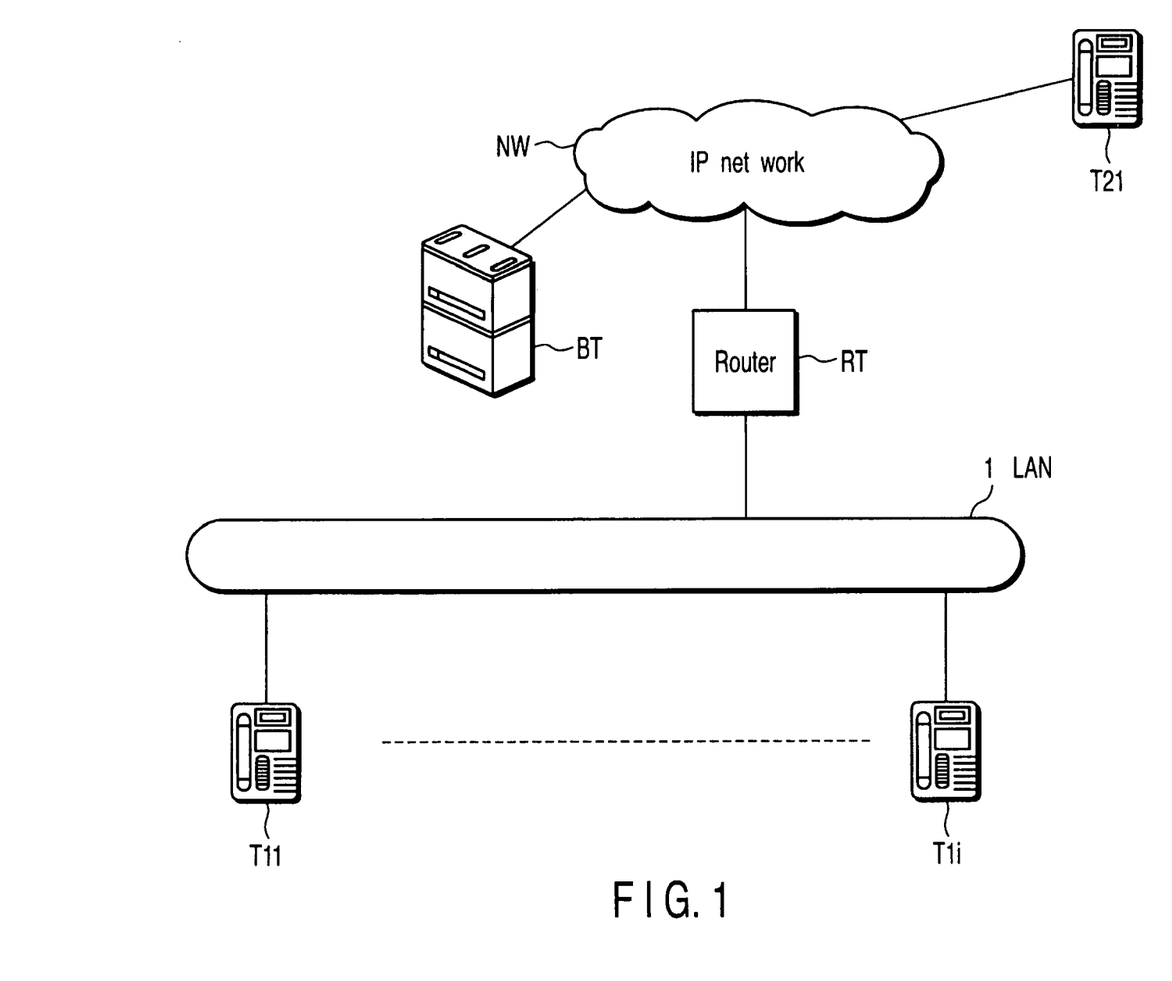
FIG. 1 is an exemplary view showing a communication system according to a first embodiment of the present invention.

FIG. 1 shows a communication system which a first embodiment of this invention is applied. The communication system includes a Local Area Network (hereinafter "LAN") 1 operating as a private network. A plurality of telephone terminals T11 to T1i ("i" is a natural number) are connected to the LAN 1. The telephone terminals T11 to T1i are provided as IP telephone terminals, each of which comprises a telephone conversation processing function and a media information processing function. In addition, the LAN 1 has a plurality of media channels, and a control channel for transmitting a control signal for determining at least one of the media channels.

The communication system includes a router RT, as a connection device, coupled to the LAN 1. The router RT comprises a communication protocol and address conversion function between the LAN 1 and an IP network NW that is a global network.

A telephone terminal T21 and an exchange apparatus BT that may be also referred as a main device, are connected to the IP network NW. The telephone terminal T21 is provided as an IP telephone terminal comprising a telephone conversation processing function and a media information processing function. The exchange apparatus BT has three basic functions. The first function is an exchange control function for the plurality of telephone terminals T11 to T1i, T21, and the router RT. The second function is an IP address allocation function for each of the telephone terminals T11 to T1I, T21 and the router RT. The third function is a function for managing an address allocated to each of the telephone terminals T11 to T1i, T21 and the router RT. In addition, the exchange apparatus BT has the following functions as set forth in FIG. 2.

Figure 2:
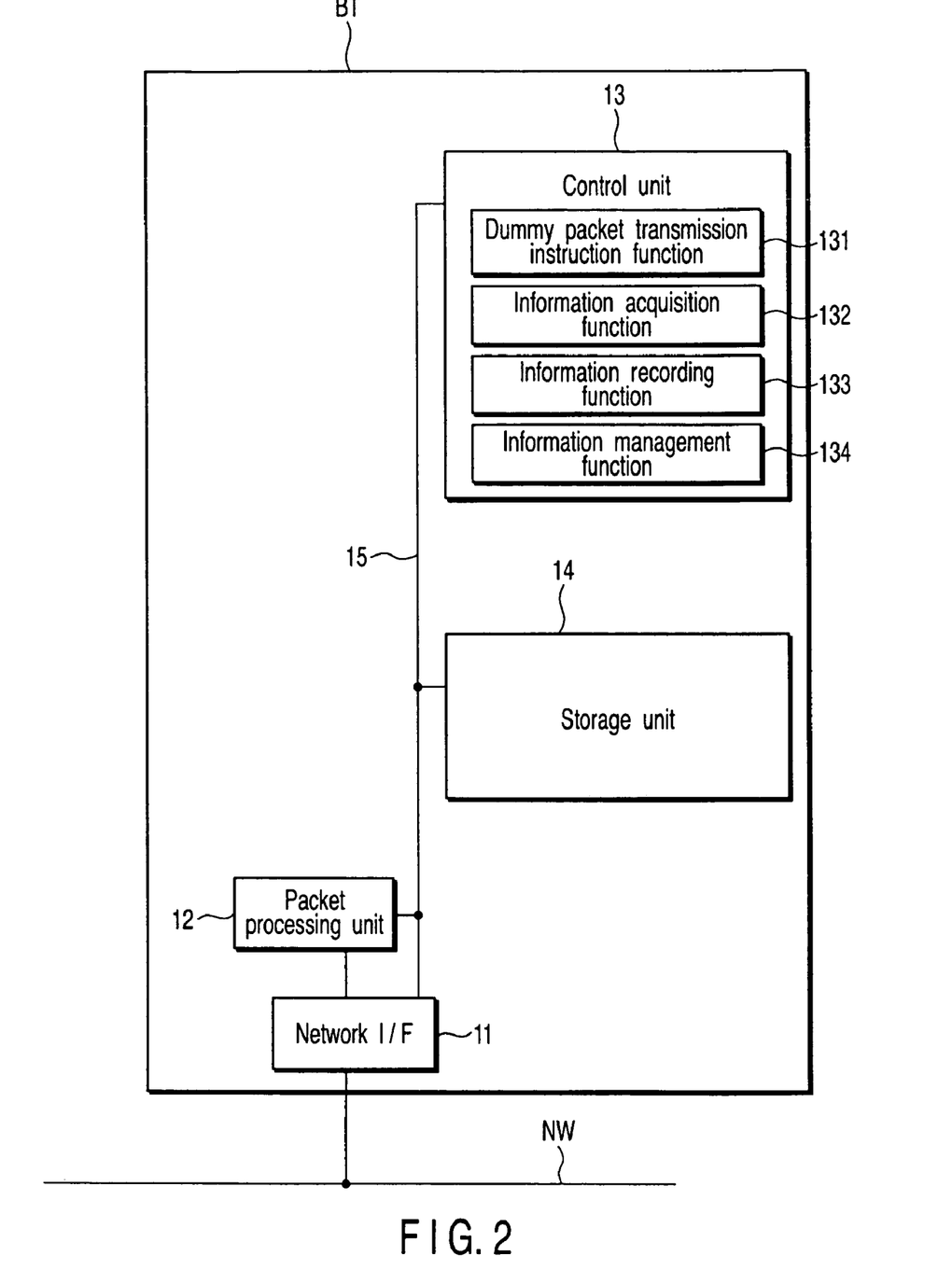
FIG. 2 is a block diagram showing an exemplary functional configuration of an exchange apparatus in the first embodiment.

FIG. 2 shows a functional configuration of the exchange apparatus BT.

That is, the exchange apparatus BT comprises a network interface (hereinafter "I/F") unit 11, a packet processing unit 12, a control unit 13, and a storage unit 14 that is a memory. The network I/F unit 11, the packet processing unit 12, the control unit 13, and the storage unit 14 are interconnected via an interconnect 15 referred to as a "data highway".

The IP network NW is coupled to the network I/F unit 11 as required. The network I/F unit 11 performs interface processing with the IP network NW that connects to the network I/F unit 11. The network I/F unit 11 also is adapted to receive control information associated with the above interface processing for transfer to the control unit 13 via the data highway 15.

The packet processing unit 12 processes a Real-time Transport Protocol (hereinafter "RTP") packet upon receipt via the IP network NW.

The control unit 13 comprises a processor (CPU), a nonvolatile memory (ROM), a volatile memory (RAM), and the like. Controls of each unit of the exchange apparatus BT is made by software processing.

The storage unit 14 stores routing information or the like required for connection control of the control unit 13.

The control unit 13, as shown in FIG. 2, comprises a dummy packet transmission instruction function 131, an information acquisition function 132, an information recording function 133, and an information management function 134. For example, when making a telephone conversation between the telephone terminal T11 and the telephone terminal T21, the dummy packet transmission instruction function 131 transmits an instruction signal so as to transmit a dummy RTP packet having inserted dummy data instead of voice data to each of the telephone terminals T11 and T21 via the control channel.

The information acquisition function 132 acquires an IP address which is a transmission source added to a header area and a data area of an RTP packet transmitted from each of the telephone terminals T11 and T21, and acquires port number information corresponding to a media channel to be used.

The information recording function 133 compares the IP address and the port number information included in the header area of a RTP packet and the IP address and the port number information included in the data area of the same RTP packet, respectively. Then, the information recording function 133 determines, on the basis of the result of the comparison, whether or not the IP address and port number information on each of the acquired telephone terminals T11 and T21 has been address-converted by means of the router RT. In the case where the information in the header area has been converted or changed by the router RT, the IP address and port number information after conversion are recorded in the storage unit 14.

The information management function 134 manages the IP address and port number information after conversion and recordation in the storage unit 14, so as to be associated with the corresponding telephone terminals T11 and/or T21. Then, the telephone terminals T11 and T21 are notified of the IP address and port number information conversion so as to make a telephone conversation.

Figure 3:
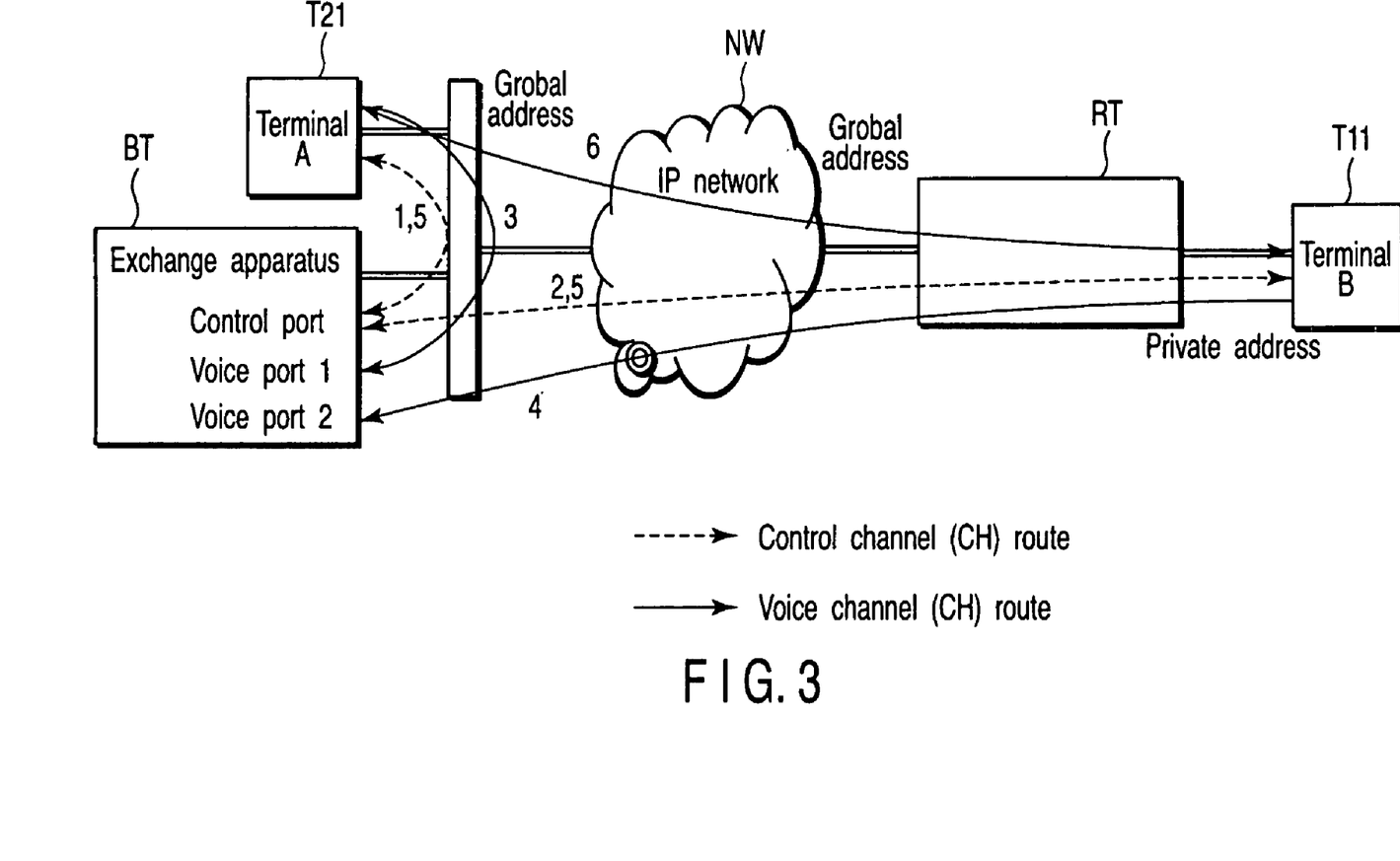
FIG. 3 is an exemplary view showing a control channel route and a voice channel route, and a negotiation sequence between telephone terminals when making a telephone conversation in the first embodiment.
Figure 4:
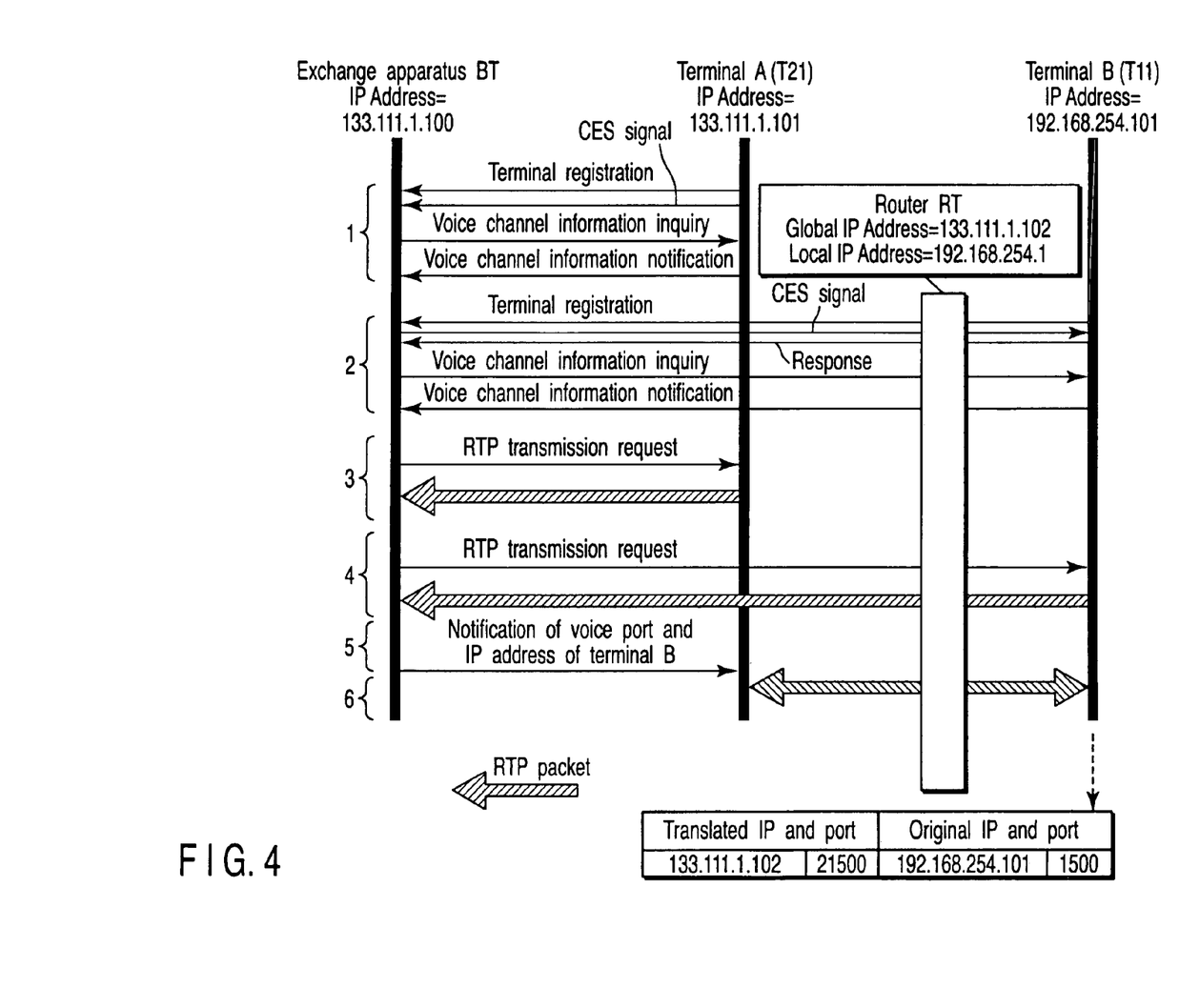
FIG. 4 is an exemplary diagram showing the negotiation sequence between telephone terminals when making the telephone conversation in the first embodiment.

Now, an operation in the above construction will be described. FIGS. 3 and 4 shows a negotiation sequence when making a telephone conversation between the telephone terminals T11 and T21.

For example, at first, a user of the telephone terminal T21 connected to the IP network NW makes a calling operation for the telephone terminal T11 in order to make a telephone conversion with the telephone terminal T11 connected to the LAN 1. Then, a communication establishment request signal (hereinafter "CER signal") is transmitted to the exchange apparatus BT from the telephone terminal T21 via the control channel on the IP network NW as represented by path 1.

The exchange apparatus BT having received the CER signal transmits the CER signal via the IP network NW, router RT, and LAN 1 to the telephone terminal T11 corresponding to the call arrival destination with reference to routing information as represented by path 2.

In the telephone terminal T11 having received the CER signal, a call is generated or a call arrival display is made, whereby generation of call arrival is broadcast to the user. When the user makes a response operation to this call arrival broadcast, for example an operation of picking up a receiver, the telephone terminal T11 transmits a response signal to the router RT. The router RT having received the response signal transmits the response signal to the IP network NW.

At this time, the exchange apparatus BT makes inquiry of a voice channel to be used via the control channel for the telephone terminal T21, and makes inquiry of a voice channel to be used via the control channel to the telephone terminal T11 as represented by paths 3 and 4.

Figure 5:
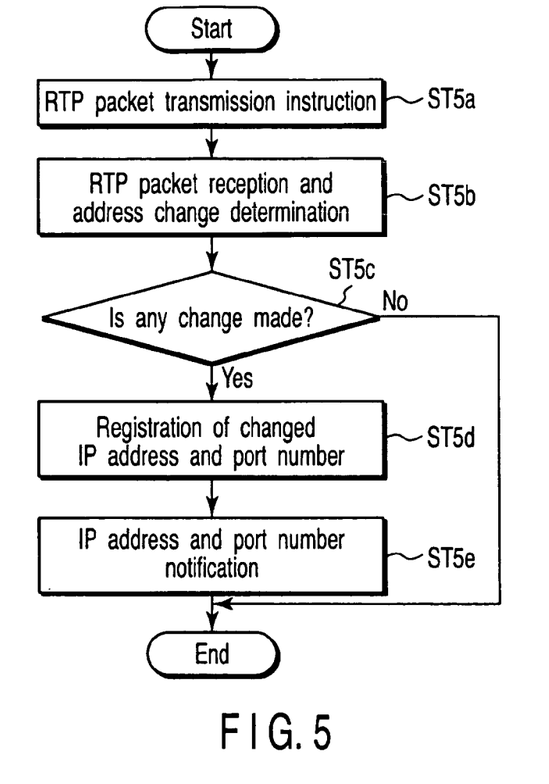
FIG. 5 is a flow chart showing an exemplary processing operation of the exchange apparatus in the first embodiment.

When the voice channel information to be used is notified from each of the telephone terminals T11 and T21 as represented by paths 5 and 6, the exchange apparatus BT executes control processing shown in FIG. 5.

In the exchange apparatus BT, the control unit 13 supplies an instruction so as to make a call origination to a voice channel ("port 1") having notified an RTP packet including dummy data instead of a voice signal to the telephone terminal T21 via the control channel (block ST5a). Similarly, the control unit 13 supplies an instruction so as to make a call origination to a voice channel ("port 2") having notified an RTP packet to the telephone terminal T11 via the control channel.

Then, the control unit 13 having received the RTP packet from the telephone terminal T21 makes comparison between a call originator IP address included in header area of RTP packet and a call originator IP address included in the data area of RTP packet (block ST5b). Based on this comparison result, the control unit 13 determines whether or not IP address conversion is made on a route (block ST5c). In the case of the telephone terminal T21, nothing is via the router RT, namely "No" in the block ST5c, and thus, the control unit 13 conducts ordinary packet processing.

On the other hand, the control unit 13 having received the RTP packet from the telephone terminal T11 makes comparison between a call originator IP address included in header area of RTP packet and a call originator IP address included in the data area of RTP packet. In the case of the telephone terminal T11, information is via the router RT, namely "Yes" in the block ST5c, and thus, the control unit 13 registers the changed IP address and port number information into the storage unit 14 so as to be associated with the telephone terminal T11 (block St5d). Then, the registered IP address and port number information are notified to the telephone terminal T21 that is a telephone conversation party (block St5e).

Thus, voice communication is enabled between the telephone terminal T21 that is a call origination source and the telephone terminal T11 that is a call arrival destination.

As set forth in the above-described first embodiment, when a telephone conversation is made between the telephone terminal T11 and the telephone terminal T21, the exchange apparatus BT acquires the IP address and port number information coming from the telephone terminal Tl1 and to be added to the header area of the RTP packet after address conversion processing by the router RT so as to manage the acquired information in the storage unit 14 so as to be associated with the telephone terminal T11.

Therefore, the telephone terminal T11 corresponding to the IP address and port number information after address conversion by the router RT is recognized in the exchange apparatus BT. Thus, the existing router and the existing telephone terminal may be utilized as they are without adding a new function to the router RT and the telephone terminals T11 to T1i and T21. Accordingly, the rise of the cost of the entire system may be restrained, and a telephone conversation between the telephone terminals T11 and T21 may be made.

In addition, according to the above-described first embodiment, only the IP address and port number information converted by the router RT are registered in the storage unit 14 of the exchange apparatus BT. Thus, proper information acquisition processing and information management processing may be performed for each RTP packet without compressing a storage capacity of the storage unit 14.

Further, according to the first embodiment, the instruction signal is transmitted so as to generate the dummy RTP packet via the control channel to each of the telephone terminals T11 and T21, whereby the IP address and port number information after address conversion by the router RT may be acquired prior to making a telephone conversation.

In this manner, telephone conversation processing may be established with a short time period when the telephone conversation is started.

Figure 6:
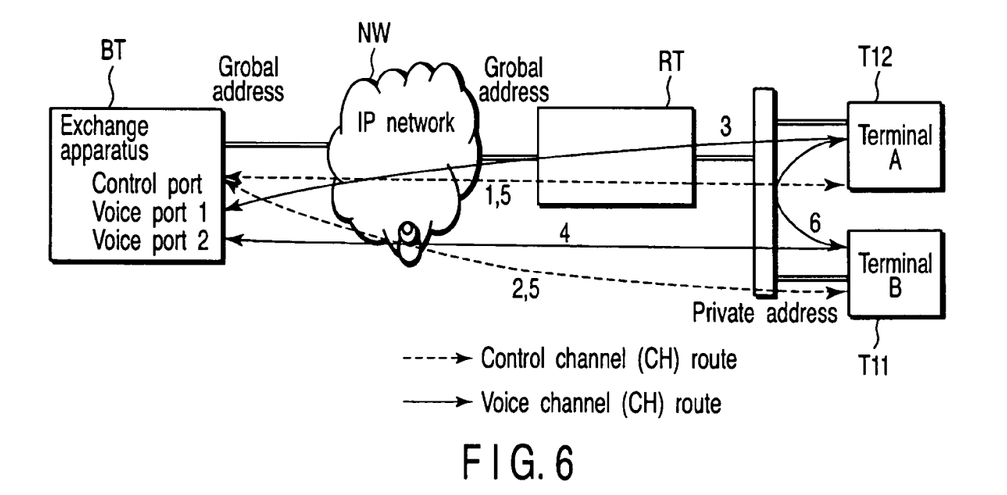
FIG. 6 is an exemplary view showing a control channel route and a voice channel route, and a negotiation sequence between telephone terminals when making a telephone conversation in a second embodiment according to the present invention.

FIG. 6 shows a communication system which a second embodiment of this invention is applied. In FIG. 6, elements and communications paths as in the FIG. 1 are assigned similar reference numerals, and a detailed description thereof is omitted since it can be ascertained through analysis of the signal communications set forth in FIGS. 3 and 4.

Figure 7:
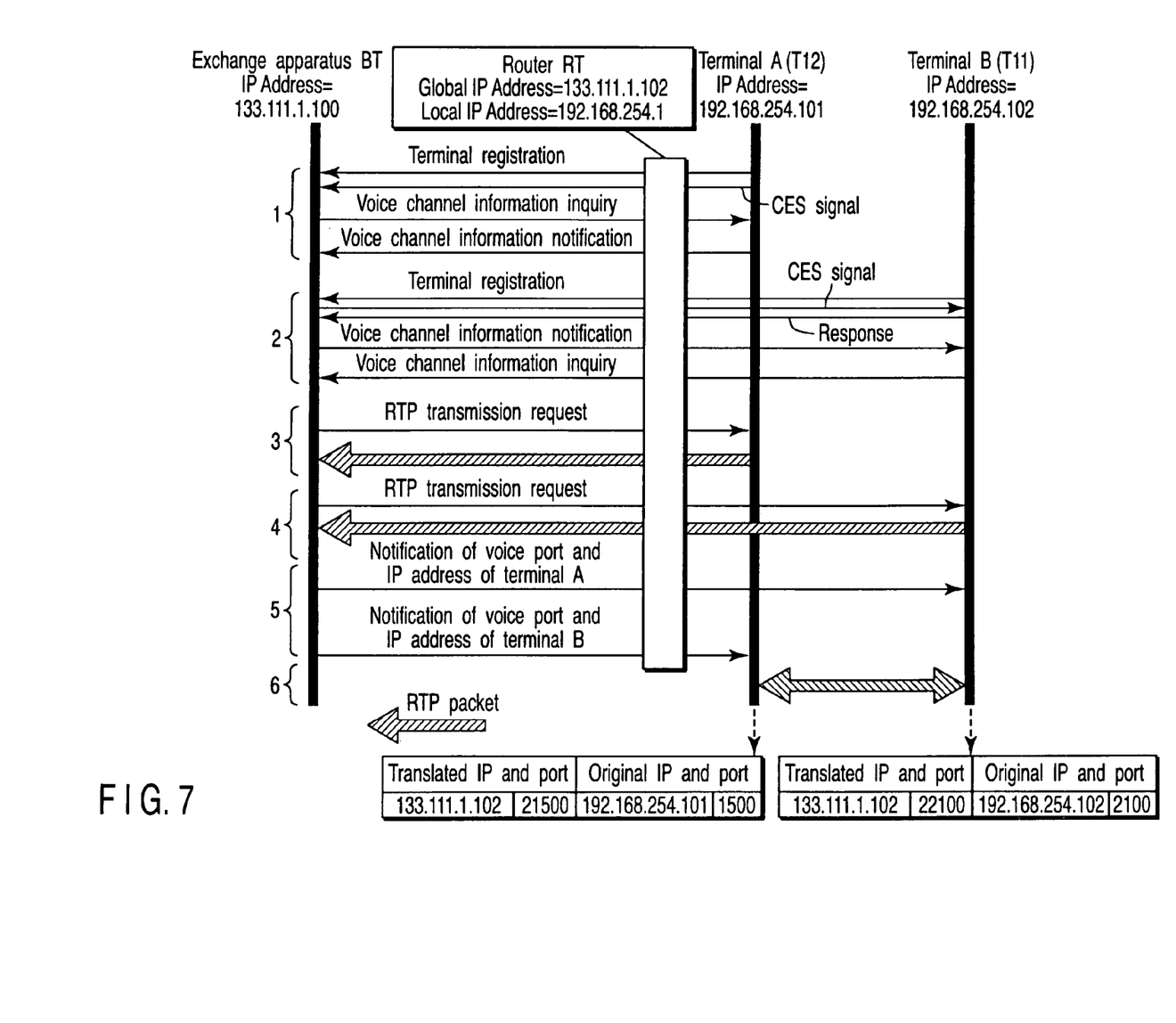
FIG. 7 is an exemplary diagram showing the negotiation sequence between telephone terminals when making the telephone conversation in the second embodiment.

FIG. 7 shows a negotiation sequence when a telephone conversation is made between the telephone terminals T11 and T12.

For example, a user of the telephone terminal T12 connected to the LAN 1 makes a call origination operation for the telephone terminal T11 in order to make a telephone communication with the telephone terminal T11 connected to the LAN 1. In this case, a communication establishment request signal (hereinafter "CER signal") is transmitted from the telephone terminal Tl2 to the exchange apparatus BT via a control channel on the LAN 1 and the IP network NW.

The exchange apparatus BT having received the CER signal transmits a CER signal via the IP network NW, router RT, and LAN 1 to the telephone terminal T11 corresponding to a call arrival destination with referring to routing information.

In the telephone terminal T11 having received the CER signal, a call is generated or a call arrival display is made, whereby the generation of call arrival is broadcast to the user. Then, when the user makes a response operation to this call arrival broadcast, for example an operation of picking up a receiver, the telephone terminal T11 transmits the response signal to the router RT. The router RT having received the response signal transmits the response signal to the IP network NW.

At this time, the exchange apparatus BT makes inquiry of a voice channel to be used via the control channel to the telephone terminal T12, and makes inquiry of a voice channel to be used via the control channel to the telephone terminal T11.

When voice channel information to be used is notified from each of the telephone terminals T11 and T12, the exchange apparatus BT supplies an instruction so as to make a call origination to a voice channel "port 1" having notified the RTP packet including dummy data instead of a voice signal to the telephone terminal T12 via the control channel. Similarly, the exchange apparatus BT supplies an instruction so as to make a call origination to a voice channel "port 2" having notified the RTP packet to the telephone terminal T12 via the control channel.

Then, the exchange apparatus BT having received the RTP packet from the telephone terminal T12 compares a call originator IP address included in header area of a RTP packet with a call originator IP address included in the data area of the RTP packet. Based on the comparison result, the control unit 13 determines whether or not address conversion is made on a route. In the case of the telephone terminal T12, as information is via the router RT, the exchange apparatus BT registers the changed IP address and port number information into the storage unit 14 so as to be associated with the telephone terminal T12. The registered IP address and port number information are notified to the telephone terminal T11 that is a telephone conversation party.

On the other hand, the exchange apparatus BT having received the RTP packet from the telephone terminal T11 compares a call originator IP address included in header area of a RTP packet with a call originator IP address included in the data area of a RTP packet. In the case of the telephone terminal T11 as well, information is via the router RT, and thus, the exchange apparatus BT registers the changed IP address and port number information into the storage unit 14 so as so as to be associated with the telephone terminal T11. The registered IP address and port number information are notified to the telephone terminal T12 that is a telephone conversation party.

Hence, a voice communication is enabled between the telephone terminal T12 that is a call origination source and the telephone terminal T11 that is a call arrival destination.

As described above, even in the above-described second embodiment, advantageous effect similar to that of the first embodiment described above may be attained. In particular, for example, in the case where a plurality of companies or individuals shares one exchange apparatus BT on an IP network NW, there is no need for replacing such one exchange apparatus with a router or a telephone terminal having a new function for each company or individual. In this manner, a telephone conversation between the telephone terminals T11 and T12 may be made without forcing a cost efficiency burden on each company or individual.

The present invention is not limited to the aforementioned embodiments. For example, although the aforementioned embodiments have described an example of acquiring and registering IP address and port number information changed by a router during call origination of a telephone terminal, the IP address and port number information changed by the router may be acquired and registered, for example, during startup of the telephone terminal. By doing this, telephone conversation processing may be established with a shorter time period after determining a voice channel. In addition, another condition may be used.

Further, although the aforementioned embodiments have described an example of connecting a exchange apparatus on an IP network, the exchange apparatus may be connected to a network other than the IP network.

Furthermore, although the aforementioned embodiments have described an example of making a voice communication, the present invention is applicable to data communication.

Moreover, although the aforementioned embodiments have described an example of a telephone terminal, for example, a personal computer having a telephone function or a server may be used.

Further, although the aforementioned embodiments have described a system comprising a LAN and an IP network having a plurality of media channels and control channels, the present invention is applicable to a system comprising an LAN and an IP network having only a media channel.

System configuration and type, construction of an exchange apparatus, identification information and communication packet type, type of a control signal for use in negotiation, negotiation procedures, processing of a communication packet and the like as well, may be embodied by variously modifying them without deviating from the gist of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system, comprising:
a plurality of telephone terminals; and
an exchange apparatus in communication with the plurality of terminals, the exchange apparatus comprises
means for transmitting a first packet to at least a first telephone terminal and a second telephone terminal of the plurality of telephone terminals when enabling a telephone conversation to be established between the plurality of terminals, the first packet being used to determine if an intermediary device that alters source address information of transmitted packets is situated between the exchange apparatus and at least one of the first telephone terminal and the second telephone terminal, an information acquisition unit to receive a packet from each of the first and second telephone terminals in response to the first packet and to access (i) source address information added to a header area and (ii) source address information contained within a data area from each received packet, an information recording unit to determine whether the source address information contained within the header area of the received packet from the first telephone terminal has been changed by comparing the source address information contained within the header area of the received packet from the first telephone terminal with the source address information contained within the data area of the received packet from the first telephone terminal, and an information management unit to notify the second telephone terminal if a change is detected and to provide the source address information contained within the header area of the received packet to the second telephone terminal.

2. The communication system according to claim 1, wherein the information recording unit of the exchange apparatus being further adapted to determine whether the source address information contained within the header area of the received packet from the second telephone terminal has been changed by comparing the source address information contained within the header area of the received packet from the second telephone terminal with the source address information contained within the data area of the received packet from the second telephone terminal.

3. The communication system according to claim 2, wherein the information management unit of the exchange apparatus to notify the first telephone terminal if a change is detected with respect the source address information associated with the second terminal and to provide the source address information contained within the header area of the received packet from the second telephone terminal to the first telephone terminal.

4. The communication system according to claim 1, wherein the exchange apparatus includes a memory to store the source address information in the header area of the received packet from the first telephone terminal upon determining that the data area of the received packet from the first telephone terminal includes a first source address information and the header area of the received packet from the first telephone terminal includes a second source address information differing from the first source address information.

5. The communication system according to claim 4 wherein the exchange apparatus stores the second source address information and a port number information included in the header area of the received packet from the first telephone terminal into the memory.

6. The communication system according to claim 1, wherein the source address information contained within the header area of the received packet from the first telephone terminal is a global Internet Protocol (IP) address, and the source address information contained within the data area of the received packet from the first telephone terminal is a private IP address used in a local area network.

7. An exchange apparatus in communications with a first communication network and a second communication network that differs from the first communication network, the exchange apparatus comprising:
means for transmitting a first packet to a first telephone terminal being part of the first communication network and a second telephone terminal being part of the second communication network, the first packet being used to determine if an intermediary device, which alters source address information of packets transmitted therefrom, is situated between the exchange apparatus and at least one of the first telephone terminal and the second telephone terminal;

an interface unit to receive a second packet from the second telephone terminal, the second packet comprises a header area including a source address information;

a control unit to determine that the source address information has been changed from an original address used in the second communication network to a changed address used in the first communication network by comparing whether the original address contained in the data area of the second packet differs from the source address information contained within the header area of the second packet; and a memory to store the changed address contained in the header area being associated with the terminal in accordance with the determination by the control unit.

8. The exchange apparatus according to claim 7, wherein the control unit transmits the changed address to the first telephone terminal.

9. The exchange apparatus according to claim 8, wherein both the header area and the data area of the second packet further includes a port number information.

10. The exchange apparatus according to claim 9, wherein the control unit also determines that the source address information has been changed when a current port number information within the header area of the second packet is different from the port number information contained in the data area of the second packet.

11. The exchange apparatus according to claim 7, wherein the second packet is a Real-time Transport Protocol packet.

12. The exchange apparatus according to claim 7, further comprising a first voice port and a second voice port.

13. The exchange apparatus according to claim 12, wherein the control unit, via the interface unit, transmits the first packet to (i) request the second telephone terminal coupled to the second communication network to send the second packet being a Real-time Transport Protocol packet to the first voice port, and (ii) request the first telephone terminal coupled to the first communication network to send a third packet being a Real-time Transport Protocol packet to the second voice port.

14. The exchange apparatus according to claim 13, wherein the control unit to determine that the source address information has been changed from an original address used in the first communication network to a changed address used in the second communication network by comparing whether the original address contained in the data area of the third packet differs from the source address information contained within the header area of the third packet.

15. The exchange apparatus according to claim 7, wherein the means for transmitting the first packet as adapted to determine if a Network Address Translator router, being the intermediary device, is situated between the exchange apparatus and at least one of the first telephone terminal and the second telephone terminal.

16. The exchange apparatus according to claim 7, wherein the first packet is a Real-Time Transfer Protocol (RTP) dummy packet having inserted dummy data instead of voice data.

17. A computerized communication method, comprising:
transmitting a first packet to a plurality of terminals including a first telephone terminal of a first communication network and a second telephone terminal of a second communication network, the first packet being used to determine if an intermediary device that is adapted to alter source address information within packets transmitted therefrom is situated between the exchange apparatus and at least one of the first telephone terminal and the second telephone terminal;

receiving a packet from the second telephone terminal in response to the first packet, the packet including a source address information therein;

determining that the source address information had been changed from an original address used in the second communication network to a changed address used in the first communication address by comparing content within a header area and a data area of the packet;

storing the changed address being associated with the second telephone terminal upon determining that the source address information has been changed to the changed address; and providing the source address information including the changed address to the first telephone terminal to enable communications between the first telephone terminal of the first communication network and the second telephone terminal of the second communication network, using the source address information.

18. The computerized communication method according to claim 17, wherein the source address information includes a port number information.

19. The computerized communication method according to claim 17, wherein the packet includes the header area and the data area that is loaded with the original address that will not be converted during transmission from the second telephone terminal of the second communication network to the first communication network.

20. The computerized communication method according to claim 17, wherein the original address is in the data area, and the changed address is in the header area.

21. The computerized communication method according to claim 17, wherein the first communication network is a global network, and the second communication network is a private network.

22. The computerized communication method according to claim 17, further comprising requesting the second telephone terminal of the second communication network to send a Real-time Transport Protocol packet to a first voice port, and requesting the first telephone terminal of the first communication network to send a Real-time Transport Protocol packet to a second voice port.

* * * * *